| United States Patent | [15] 3,673,212 |
| --- | --- |
| Denss et al. | [45] June 27, 1972 |

[54] SUBSTITUTED PHENYLACETIC ACIDS AND ESTERS THEREOF

[72] Inventors: Rolf Denss, Basel, Switzerland; Niels Clauson-Kaas, Farum, Denmark; Franz Ostermayer, Riehen, Switzerland

[73] Assignee: Geigy Chemical Corporation, Ardsley, N.Y.

[22] Filed: April 29, 1970

[21] Appl. No.: 43,637

Related U.S. Application Data

[62] Division of Ser. No. 679,224, Oct. 30, 1967, Pat. No. 3,579,535.

[30] Foreign Application Priority Data

Oct. 31, 1966 Switzerland ..........................15768/66
Jan. 18, 1967 Switzerland .............................713/67
Aug. 1, 1967 Switzerland ..........................11178/67

[52] U.S. Cl..................................................260/326.3
[51] Int. Cl. .......................................................C07d 27/26
[58] Field of Search..................................260/326.3, 326.62

[56] References Cited

UNITED STATES PATENTS 3,151,121  9/1964  Karmas et al. ..................260/326.3 X

*Primary Examiner*—Alex Mazel
*Assistant Examiner*—Joseph A. Narcavage
*Attorney*—Karl F. Jorda and Martin J. Spellman

[57] ABSTRACT

Substituted phenyl acetic acids, addition salts thereof with bases as well as esters thereof, which compounds exhibit useful antiinflammatory (antiphlogistic), analgesic and antipyretic activity, and processes for the production of these compounds, as well as starting materials used in said processes; therapeutic compositions containing these compounds, and methods of treatment, particularly methods of inducing antiinflammatory, analgesic and antipyretic effects in mammals. Illustrative embodiments are 2-[p-(1-pyrryl)-phenyl]-butyric acid, [3-chloro-4-(1-pyrryl)-phenyl]-acetic acid and 2-[p-(1-pyrryl)-phenyl]-propionic acid methyl ester.

4 Claims, No Drawings

SUBSTITUTED PHENYLACETIC ACIDS AND ESTERS THEREOF

This application is a division of application Ser. No. 679,224, filed Oct. 30, 1967, now U.S. Pat. No. 3,579,535.

DETAILED DISCLOSURE

The invention relates to substituted phenyl acetic acids, to addition salts thereof with inorganic or organic bases, as well as to esters thereof, which compounds exhibit valuable pharmacological properties. It further pertains to processes for the production of these compounds and is also concerned with starting materials used in said processes. It is further an object of the invention to provide therapeutic compositions consisting essentially of (1) a substituted phenyl acetic acid according to the invention, or an ester thereof, or a pharmaceutically acceptable addition salt thereof with an inorganic or organic base, and (2) a pharmaceutical carrier. Another object of the invention is to provide methods of treatment involving the administration to a mammal requiring such treatment of a pharmacologically effective amount of a substituted phenyl acetic acid according to the invention, or an ester thereof, or a pharmaceutically acceptable addition salt thereof with an inorganic or organic base; the methods of treatment according to this invention comprise particularly a method of producing an antiinflammatory (antiphlogistic) effect, a method of producing an analgesic effect as well as a method of producing an antipyretic effect.

Substituted phenyl acetic acids and esters thereof corresponding to the formula I

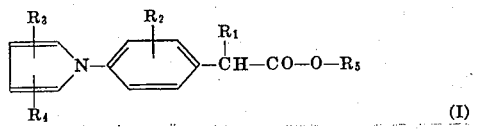

(I)

wherein $R_1$ represents hydrogen, lower alkyl, lower alkenyl or lower alkynyl, $R_2$ represents hydrogen, lower alkyl, lower alkoxy or halogen, and $R_3$, $R_4$ and $R_5$ independently of each other represent hydrogen or lower alkyl, as well as the addition salts of the carboxylic acids having the formula I with inorganic or organic bases, have not been described up to now.

In the compounds of formula I and the related starting materials mentioned hereinafter, $R_1$ as a lower alkyl group is, e.g., the methyl, ethyl, n-propyl, isopropyl, n-butyl, isobutyl, sec. butyl, n-pentyl, isopentyl, neopentyl, n-hexyl or isohexyl group; as a lower alkenyl group is, e.g., the allyl, 2-methylalkyl or crotyl group; and as a lower alkynyl group is, e.g., the 2propynyl, 2-butynyl or 3-butynyl group. $R_2$ as a lower alkyl group which is also occuring in a lower alkoxy group $R_2$ is, e.g., the methyl, ethyl, n-propyl, isopropyl, n-butyl, isobutyl or tert. butyl group and as halogen atom, e.g., chlorine, bromine or fluorine. Lower alkyl groups $R_3$ and $R_4$ are, e.g., methyl, ethyl, n-propyl or isopropyl groups. The lower alkyl group $R_5$ is, e.g., the methyl, ethyl, n-propyl, isopropyl, n-butyl, isobutyl, tert. butyl, n-pentyl, isopentyl or n-hexyl group.

If not otherwise defined the terms "low alkyl" or "lower alkyl" as used herein per se and as included in the terms "low alkoxy" or "lower alkoxy," respectively, mean saturated monovalent aliphatic groups of the general formula $—C_mH_{2m+1}$ wherein $m$ designates an integer of less than 7 and are inclusive for both straight and branched chain-groups, whereas the terms "low alkanol" or "lower alkanol" mean compounds of the general formula $C_mH_{2m+1}·OH$, the definition of the $—C_mH_{2m+1}$ moiety of which corresponds to that given above for low alkyl or lower alkyl, respectively.

For the production of compounds of the formula I and salts of the carboxylic acids having this formula with inorganic or organic bases, according to the invention a compound of the formula II

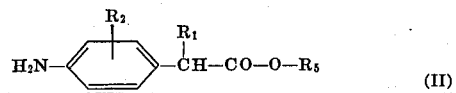

(II)

wherein $R_1$, $R_2$ and $R_5$ have the same meaning as given in formula I, is reacted with a monomeric or polymeric, saturated aliphatic γ-dioxo compound with at most 10 carbon atoms, or with an open chain or cyclic, functional derivative thereof, especially with an open chain or cyclic acetal or ketal, acylal, α-halo ether, enol ether or enol ester corresponding to the general formula III

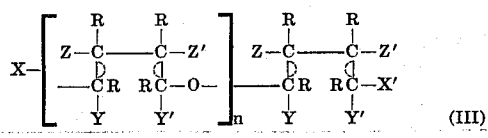

(III)

wherein at most two R's in each unit represent low alkyl groups and the rest represent hydrogen atoms, X and X' independently of each other represent radicals of the formulas $R_6—O—$ and $R_6—CO—O—$, wherein $R_6$ represents an optionally halogen-substituted hydrocarbon radical or chlorine or bromine atoms, or X' together with Y' is also the Oxo radical $=0$, Y and Y' independently of each other represent radicals of the above-defined formulas $R_6—O—$ or $R_6—CO—O—$ or both together the epoxy radical $—O—$, or each together with Z or Z', respectively, represents an extra bond corresponding to the dotted lines, and Z and Z' represent hydrogen atoms, provided they do not have the above given meaning, and $n$ represents 0 or a low whole number, or with a mixture of such substances while heating in the presence or absence of a diluent and/or condensing agent, and if desired a free carboxylic acid of the general formula I so obtained is converted into a salt with an inorganic or organic base.

As examples of γ-dioxo compounds usable according to the invention succinicaldehyde, 2-methylsuccinicaldehyde, 2,3-dimethyl-succinicaldehyde, levulinic aldehyde, 4-oxohexaldehyde and 2,5-hexanedione can be mentioned.

Of the compounds of general formula III which can be used instead of the monomeric or polymeric, saturated aliphatic γ-dioxo compounds with at most 10 carbon atoms, the following are mentioned as examples of open-chain derivatives of monomeric succinicaldehyde: acetals such as succinic aldehyde monodiethyl acetal, succinic aldehyde bis-dimentyl acetal, succinic aldehyde bis-diethyl acetal; acylals such as succinic aldehyde-1,1-diacetate (4,4-diacetoxy-butyraldehyde); enol ethers such as 1,4-diphenoxy-butadiene; enol esters such as 1,4-diacetoxy-butadiene. Compounds of the general formula III in which Y and Y' together form the epoxy radical are tetrahydrofuran derivatives which react in the same way as the acetals or acylals of succinic aldehyde and other γ-dioxo compounds as defined or as the open chain α-halogen ethers, depending on the meaning of X and X'. Such compounds are, for example, the following, optionally substituted by low alkyl groups: 2,5-dialkoxy-tetrahydrofuran and related compounds, such as 2,5-dimethoxy-tetrahydrofuran, 2,5-diethoxy-tetrahydrofuran, 2,5-dipropoxy-tetrahydrofuran, 2,5-dimethoxy-tetrahydrofuran, 2,5-bisallyloxy-tetrahydrofuran, 2,5-bis-(2-chloroethoxy)-tetrahydrofuran, 2,5-diphenoxy-tetrahydrofuran and 2,5-bis-(3,4-xylyloxy)-tetrahydrofuran, 2-methyl-2,5-dimethoxy-tetrahydrofuran and 3-methyl-2,5-dimethoxy-tetrahydrofuran, furthermore 2,5-diacyloxy-tetrahydrofurans, such as 2,5-diacetoxy-tetrahydrofuran, as well as 2,5-dihalo-tetrahydrofurans, such as 2,5-dichloro-tetrahydrofuran and 2,5-dibromo-tetrahydrofuran and, finally, also compounds which are regarded as two types simultaneously such as 2-chloro-5-(2-chloroethoxy)-tetrahydrofuran and 2-allyloxy-5-chloro-tetrahydrofuran.

Compounds of the general formula III in which "$n$" is 1 or higher than 1 and, particularly mixtures of such compounds wherein "$n$" is different, are formed, e.g., on treating polymeric succinic aldehyde with amounts of acetalizing or acylating substances or mixtures of substances which are less than equivalent to the succinic aldehyde units present.

A suitable medium for the reaction according to the invention when a free γ-dioxo compound is used, is any solvent in which the γ-dioxo compound is soluble, for example, methanol, ethanol or acetic acid. Acetals and acylals of the γ-dioxo compounds as well as cyclic, acetyl-like derivatives are advantageously reacted in acetic acid as solvent and condensing agent, or in the presence of catalytic amounts of an acid condensing agent, such as p-toluene sulphonic acid, in the presence or absence of an inert organic solvent or diluent such as benzene, toluene, o-dichlorobenzene or acetonitrile. The reaction of compounds of the general formula III wherein X and/or X' are halogen atoms is performed, e.g., in inert organic solvents such as chloroform or those given above. The reaction temperature lies preferably between room temperature and the boiling temperature of the solvent or diluent used, the lower limit being used in particular for the halogen compounds last mentioned above.

Several compounds of the general formula II, such as (p-aminophenyl)-acetic acid and p-amino-hydrotropic acid as well as some lower alkyl esters of both acids, 2-(p-aminophenyl)-butyric acid and 2-(p-aminophenyl)-valeric acid are known. Further compounds of the general formula II can be produced analogously to the known compounds or by other processes which are known per se.

According to a second process related to that above, compounds of the general formula I and salts of the carboxylic acids having this formula, are obtained by heating a mixture of a compound of the general formula II or a salt thereof with an acid of the formula IV

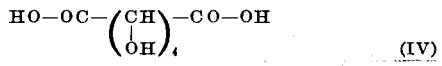

particularly with mucic acid or saccharic acid unit substantially four times the molar amount of water and double the molar amount of carbon dioxide are split off, and if desired converting the thus obtained free carboxylic acid having the general formula I into a salt with an inorganic or organic base. The reaction according to the aspect of the invention is preferably performed at temperatures between 100° and 300° in the presence or absence of inert organic solvents having a medium or high boiling point or range such as xylenes, xylene mixtures or diethylene glycol dimethyl ether. The reaction may be performed in one step or in two separate steps — in that, after heating, an intermediate corresponding p-(2-carboxyl-1-pyrryl) compound is isolated as main product or as a side product, when the reaction is partially taken to completion, and is then decarboxylated by further heating — as necessary. Mucic acid or saccharic acid salts of compounds of the general formula II can also be converted by dry distillation or sublimation into corresponding compounds of the general formula I. The dry-distillation or sublimation is conducted at reduced pressure so that suitable reaction temperature may be used.

In a third process compounds of the general formula I and salts of the carboxylic acids having this formula are obtained by heating a compound of the general formula V

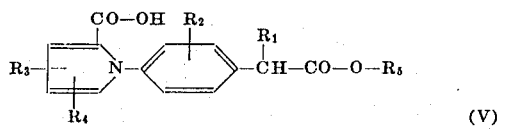

wherein $R_1$, $R_2$, $R_3$, $R_4$ and $R_5$ have the meanings given above, until an equimolar amount of carbon dioxide is split off, and if desired, converting the thus obtained free carboxylic acid of the general formula I into a salt with an inorganic or organic base. The splitting off of the carboxylic group bound in the 2 position of the pyrrol ring occurs at relatively low temperatures, e.g., between 170°– 230°, preferably at about 200°. It can be performed in the absence of solvent or diluents, or optionally with such agents, e.g., high boiling tertiary heterocyclic bases such as collidine or chinoline together with copper oxide or copper powder as catalyst.

Starting materials of the general formula V are obtained for example by condensing compounds of the general formula II, defined above, with lower 2,5-dialkoxy-tetrahydro-2-furancarboxylic acid alkyl esters, which are optionally substituted according to the definition for $R_3$ and $R_4$ in positions 3', 4' or 5' analogous to the first mentioned process of producing compounds of the general formula I, by subsequently hydrolyzing the so obtained 1-[p-(1-carboxymethyl)-phenyl]-pyrrol-2-carboxylic acid alkyl esters or 1[p-(1-alkoxycarbonyl-methyl)-phenyl]-pyrrol-2-carboxylic acid alkyl esters, which are optionally substituted according to the definition for $R_1$, $R_2$, $R_3$ and $R_4$. In the second given process it has already been mentioned that on reacting compounds of the general formula II with mucic acid or saccharic acid optionally (p-2-carboxyl-1pyrryl) compounds may be isolated as intermediate products. Such products are also starting materials of the general formula V, wherein $R_3$ and $R_4$ are always hydrogen atoms. The above mentioned second reaction step of the second given process corresponds to the instant third given process of producing compounds of the general formula I.

According to a fourth process compounds of the general formula I in which $R_1$ represents a low alkyl, low alkenyl or low alkynyl group, are produced by reacting a compound of the general formula Ia

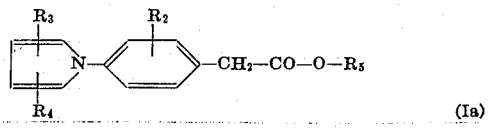

which falls within the scope of the formula I and in which $R_2$, $R_3$, $R_4$ and $R_5$ have the same meanings as given in Formula I, in the presence of substantially double the molar amount or equimolar amount of an alkaline condensing agent, according to whether $R_5$ is hydrogen or a low alkyl group, which substantially equimolar amount of a reactive ester of a hydroxy compound of the general formula VI

in which $R_1'$ has the same meaning as $R_1$ in formula I with the exception of hydrogen, i.e., it stands for a low alkyl, low alkenyl or low alkynyl group, and when an alkali salt of a carboxylic acid of general formula I is obtained, optionally liberating the free acid and, if desired, again converting it into a salt with an inorganic or organic base. By substantially double molar or equimolar amounts of alkaline condensing agent or equimolar amounts of reactive esters are understood such amounts which, in consideration of the availability of the starting materials of the general formula Ia as well as the possibility of separating the desired monoalkylation product from the starting material on the one hand and from any resulting dialkylation product on the other hand, give the best possible yield of pure end product. In practice, approximately 1.8–2.6 or 0.9 – 1.3 times the molar amount of condensing agent, or 0.6 – 1.5 times the molar amount of reactive ester, calculated on the starting material of the general formula Ia, is used. Suitable alkaline condensing agents are for example alkali metal amides and alkali metals, particularly sodium amide or sodium, in liquid ammonia as reaction medium at reaction temperatures of from about −80° to room temperature, preferably at about −50° to −30°. The starting materials of the general formula Ia can be obtained, for example, according to the first mentioned process for the production of compounds of the general formula I as well as according to processes mentioned further below. Suitable reactive esters of hydroxy compounds of general formula VI, i.e., of low alkanols, alkenols and alkynols are, for example, halides such as bromide, iodide and chloride, also sulphonic acid esters, such as methane sulphonic acid ester and p-toluene sulphonic acid ester, as well as dimethyl sulphate and diethyl sulphate.

According to a fifth process compounds of the general formula I and the salts of the free acids having this general formula are obtained by reacting a compound of the general formula VII

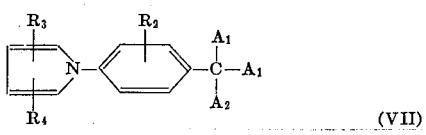

(VII)

wherein $A_1$ represents a low alkoxy-carbonyl group (—CO—O—alkyl) or the cyano group, particularly lower alkoxy carbonyl, and $A_2$ represents a lower alkoxy-carbonyl group, a lower alkoxalyl group (—CO—CO—O—alkyl), the cyano group or the acetyl group, particularly lower alkoxy-carbonyl, and $R_1$, $R_2$, $R_3$ and $R_4$ have the meanings given under formula I, with an alkali hydroxide in an organic, organic-aqueous or aqueous medium, or, if neither $A_1$ nor $A_2$ is a cyano group, reacting with an alkalialkanolate in anhydrous medium, or if $A_2$ is not an acetyl group, reacting with an aqueous mineral acid, liberating the free acid from the alkali salt of a dicarboxylic acid or a dicarboxylic monoalkylester obtained when an alkali hydroxide is used, and heating until the equimolar amount of carbon dioxide and, as the case may be, carbon monoxide is split off and if desired converting a so-obtained free carboxylic acid into a salt with an inorganic or organic base.

The reactions with alkali hydroxides, especially sodium or potassium hydroxide are preferably performed while heating. Examples of suitable reaction medium are, e.g., lower alkanols, such as methanol, ethanol, isopropanol or n-butanol, also an alkandiole or a monoalkyl ether thereof, e.g., ethyleneglycol, 2-methoxy-ethanol or 2-ethoxyethanol, adding, as the case may be, water to the said solvents in a volume ratio from about 10:1 to 1:2. Furthermore water or, e.g., a mixture of water and water soluble etheric solvents, such as dioxan or tetrahydrofuran can be used.

On reacting malonic acid dialkylesters, acetacetic acid alkylesters or alkoxalylacetic acid alkylesters with alkali-alkanolates preferably the same lower alkanol, such as methanol, ethanol, n-butanol as a component of the starting esters and of the alkanolates, as well as the reaction medium is present. An alcoholysis can however also be carried out using as reaction medium a relatively high boiling alkanol which is not identical to the lower alkanol present as ester component and distilling off a part thereof together with the reaction according to the definition. If the esters of the general formula I, obtained as reaction product, are not used directly as active substance but are to be hydrolyzed to the corresponding acid a partial alcoholysis may be performed. Furthermore as reaction medium instead of lower alkanol may be used, e.g., an inert organic solvent such as benzene or toluene. The reaction according to the definition is performed at room temperature or elevated temperature, e.g., at boiling temperature of the reaction medium used.

While in the prior mentioned process salts or esters of monocarboxylic acids of the general formula I are obtained during the reaction with alkaline hydroxides under vigorous reaction conditions, e.g., in a boiling mixture of ethyleneglycol with little water, under milder conditions, e.g., in water or in lower alkanols first salts of dicarboxylic acids are obtained, or if a dicarboxylic acid dialkylester having the general formula VII is reacted with only the equimolar amount of alkalihydroxide the salts of the monoalkyl esters of the carboxylic acids are obtained. From these according to the process the corresponding dicarboxylic acids or dicarboxylic acid monoalkyl esters of the formula VIIa

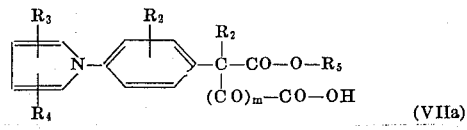

(VIIa)

wherein $m$ represents 0 or 1, and $R_1$, $R_2$, $R_3$, $R_4$ and $R_5$ have the meanings given in formula I, are liberated and then decomposed to compounds of the general formula I. The compounds of the general formula VIIa as intermediate products are produced not only according to the above process from compounds of the general formula VII but also by other means. For example dicarboxylic acids of the general formula VIIa are produced by hydrolyzing the corresponding dibenzylesters as well as by mild acid hydrolysis of ditert. butyl esters, while dicarboxylic-mono alkyl esters of the general formula VIIa can be produced, e.g., by hydrogenolyzing corresponding benzyl alkyl esters or also by hydrolyzing corresponding dialkylesters under mild conditions, e.g., with an equimolar amount of an alkali acetate in the lower alkanol corresponding to the group $R_5$. Furthermore alkali salts of dicarboxylic acids of the general formula VIIa are produced analogously to a process mentioned below for the production of carboxylic acids or alkali salts thereof falling under the general formula I by reacting instead of optionally the lower (p-sulfinylimino phenyl)acetic acid alkyl esters of the general formula XIII which are substituted corresponding to the definition for $R_1$ and $R_2$, the corresponding lower (p-sulfinylimino-phenyl)-malonic acid dialkyl esters, lower (p-sulfinylimino)-oxalic acetic acid dialkyl esters or lower (p-sulfinylimino)-cyanic acetic acid alkyl esters with butadiene or alkyl substituted butadiene of the general formula XIV and by reacting the addition products analogously to the compounds of the general formula XV with alkali hydroxydes, especially in organic or aqueous-organic medium while heating.

The process defined further above comprises therefore also an embodiment according to which a compound of the general formula VIIa produced from a compound of the general formula VII or by other means, wherein $m$, $R_1$, $R_2$, $R_3$, $R_4$ and $R_5$ have the meaning given therein or under formula I is heated in presence or absence of a catalyst and a solvent or a diluent until the equimolar amount of carbon dioxide and, in such a case, carbon monoxide is split off, and if desired obtained free carboxylic acid is converted into a salt with an inorganic or organic base.

Starting materials of the general formula VII are produced starting from lower [p-(1-pyrryl)-phenyl]-acetic acid alkyl esters which are substituted according to the definition for $R_2$, $R_3$ and $R_4$ and correspond to the general formula Ia or from optionally correspondingly substituted [p-(1-pyrry)-phenyl]-acetonitrile which may be obtained analogously to the first mentioned production process from corresponding (p-amino phenyl)-acetonitriles. The mentioned alkylesters or nitriles are condensed with the aid of alkali metal alkanolates with lower dialkylcarbonates, lower oxalic acid alkyl esters or lower acetic acid alkyl esters yielding compounds of the general formula VII with a hydrogen atom as radical $R_1$. The alkali metal compounds of these intermediate products are reacted with reactive esters of hydroxyl compounds of the general formula VI to compounds of the general formula VII with a radical $R_1$ other than hydrogen. The sequence of the different operations which finally lead to compounds or the general formula VII may be varied in various ways, e.g., starting from p-nitrophenyl malonic acid dialkyl esters or p-nitrophenyl cyano acetic acid alkyl esters, first reducing these to the corresponding p-aminophenyl compounds and then closing the ring of the latter to the corresponding p-(1-pyrryl)-phenyl compounds. Furthermore substituted cyano acetic acid alkyl esters may be converted into correspondingly substituted malonic acid dialkyl esters in different well known reaction stops, e.g., by reacting with hydrogen chloride and with an aqueous lower alkanol. As (p-nitrophenyl)-cyano acetic acid (lower)-alkyl esters may be produced not only from corresponding (p-nitrophenyl)acetic acid (lower)alkyl esters or (p-nitrophenyl)-acetonitriles, that means not only from compounds from which end products of the general formula I with a hydrogen atom as $R_1$ are accessible in the shortest way, but also by condensing p-nitrochlorobenzene with cyano acetic acid alkyl esters, the final transformation of compounds of the formula VII into those of the general formula I is also of practical importance, when in the mentioned compounds $R_1$ is represented by hydrogen. Finally, starting materials of the general formula VII can be produced in situ, that means immediately before being directly split according to the invention by means of alkali hydroxides to alkali salts of carboxylic acids of the general formula I, in the same working operation from the partly already mentioned addition products which are analogous to the compounds of the general formula XV, of (p-sulfinyliminophenyl)-malonic acid di(lower)alkyl esters, (p-sulfinyliminophenyl)-oxalic acetic acid di(lower)alkyl esters, (p-sulfinyliminophenyl)-cyano acetic acid (lower)alkyl esters and (p-sulfinyliminophenyl)-acetacetic acid (lower)alkyl esters which are optionally substituted according to the definition for $R_1$ and $R_2$ with butadiene or alkyl substituted butadienes of the general formula XIV, as under formation of the 1-pyrryl group the ring contraction already occurs under reaction conditions which are not sufficient for splitting off according to the process to the alkaline salts of monocarboxylic acids or occurs quicker under vigorous reaction conditions than the above-mentioned splitting off.

According to a sixth process, compounds of the general formula Ia are produced by reacting a compound of the general formula VIII

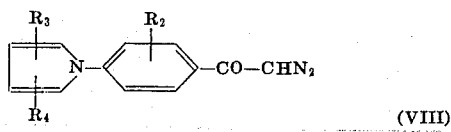

(VIII)

in which $R_2$, $R_3$ and $R_4$ have the meanings given in formula I, in the presence of a silver salt, silver oxide, copper or platinum as catalyst with water, with a low alkanol or another hydroxy compound, if desired hydrolyzing the low alkyl ester so obtained or in any case hydrolyzing an ester with another hydroxy compound and, if desired, converting a carboxylic acid so obtained into a salt with an inorganic or organic base. For example, a solution of the diazoketone of the general formula VIII is slowly added to aqueous solution of silver nitrate and sodium thiosulphate or to a suspension of silver oxide in an aqueous solution of sodium thiosulphate whereby the temperature of the aqueous solution or suspension is about 60°–70°. According to an advantageous modification of the process, freshly prepared silver oxide is mixed portionwise into a solution of the diazoketone in a low alkanol at the boiling temperature of the latter until no further evolution of nitrogen can be ascertained, and if desired, the resulting low alkyl ester is hydrolyzed for example by means of alkanolic potassium hydroxide solution or sodium hydroxide solution while heating. Starting materials of the general formula VIII can be produced by reaction of p-(1-pyrrl)-benzoyl-chloride which is substituted according to the definition for $R_2$, $R_3$ and $R_4$, with diazomethane, by methods already known per se. The necessary acid chlorides are in turn obtained by condensing p-amino benzoic acid which is optionally substituted according to the definition of $R_2$, with a compound of the above given general formula III, analogously to the first given process for the production of compounds of the general formula I, and then by treating the optionally substituted p-(1-pyrrl)-benzoic acid so obtained with thionyl chloride in the presence of an acid binding agent, such as pyridine, or with oxalyl chloride.

According to a seventh process, compounds of the general formula I in which $R_1$ is a low alkyl group, are obtained by treating a compound of the general formula IX

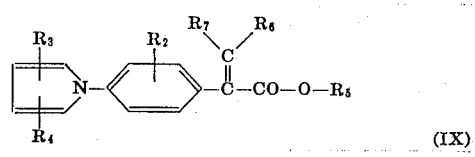

(IX)

in which $R_6$ and $R_7$ represent hydrogen or low alkyl groups of together at most for carbon atoms, and $R_2$, $R_3$, $R_4$ and $R_5$ have the meanings given in formula I, with catalytically activated or nascent hydrogen until substantially equimolar amounts have been absorbed, and if desired converting the carboxylic acid so obtained into a salt with an inorganic or organic base. For example, a compound of the general formula IX is hydrogenated in the presence of a precious metal catalyst such as platinum on charcoal, in glacial acetic acid or ethanol under normal or moderately raised pressure, or such a compound is reduced by means of sodium and a low alkanol or by means of sodium amalgam and water.

Starting materials of the general formula IX are for example produced by reacting metal organic compounds of p-(1-pyrryl)-phenyl, e.g., of p-(1-pyrryl)-phenyllithium or p-(1-pyrryl)-phenyl magnesium bromide which are optionally substituted according to the definition for $R_2$, $R_3$ and $R_4$ with pyruvic acid or other, lower 2-oxoalkane acids to optionally substituted 2-[p-(1-pyrryl)-phenyl]- 2-hydroxy-alkane acids and if desired by reacting these in lower alkyl esters and in any case finally by splitting off water, e.g., by heating with mineral acids. The above mentioned 2-[p-(1-pyrryl)-phenyl]-2hydroxy-alkane acids and their lower alkyl esters correspond to the general formula IXa mentioned below. The substituted 2-hydroxy alkane acids of this general formula can also be prepared by a further metal organic reaction consisting of the reaction of p-(1-pyrryl)-phenyl glyoxyl acids which are optionally substituted according to the definition for $R_2$, $R_3$ and $R_4$ with lower alkyl magnesium halogenides. Substituted 2-hydroxy alkane acids of the general formula IXa with hydrogen atoms as $R_6$ and $R_7$ are also obtained for example by addition of cyanic acid to be substituted acetophenones of the general formula XI mentioned below, by hydrolyzing in the cold obtained cyano hydrines with conc. mineral acids to the corresponding substituted 2-hydroxy alkane amides and further hydrolyzing of the latter by means of alkali lyes while heating.

Another approach to the starting materials of the general formula IX with hydrogen atoms as $R_6$ and $R_7$ consists in reducing p-nitro-atropic acid to p-amino atropic acid and condensing the latter with a compound of the general formula II analogously to the first mentioned process for the production of compounds of the general formula I. Starting materials of the general formula IX with low alkyl groups as $R_6$ and $R_7$ can be produced, for example, by condensing p-nitro-phenyl-acetonitrile with low dialkyl-ketones in the presence of sodium alcoholates, hydrolyzing the nitrile so obtained, reducing the nitro group and again condensing with compounds of the general formula III.

According to a modification of the process mentioned above a compound of the general formula IXa

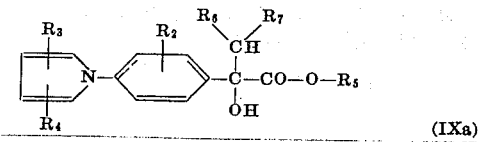

(IXa)

wherein $R_2$, $R_3$, $R_4$, $R_5$ and $R_7$ have the meanings given in formula I and formula IX, respectively, is reduced instead of a compound of the general formula IX and, if desired, the carboxylic acid obtained is converted to a salt with an inorganic or organic base. The reduction of the compounds of the general formula IXa takes place for example by means of tin(II)-chloride in a mixture of hydrochloric acid and acetic acid or by means of iodine and phosphorus in acetic acid. The reductions are performed preferably at elevated temperature, e.g., at the boiling temperature of the reaction mixture mentioned.

The starting materials of the general formula IXa have been mentioned above as intermediate products for the production of compounds of the general formula IX. The present modification of the eighth process for the production of the compounds of the general formula I is thus a single step variation of a double step reaction sequence according to which first compounds of the general formula IXa are converted into compounds of the general formula IX by splitting off water and the latter are hydrogenated or reduced to form compounds of the general formula I.

While according to the preceding processes, carboxylic acids as well as their low alkyl esters can be produced, carboxylic acids having general formula I and their salts with inorganic and organic bases are obtained according to an eighth process in which a functional derivative of a carboxylic acid of this general formula is hydrolyzed, the acid optionally liberated from the obtained salt and/or an acid so obtained converted into a salt. As starting material can be chosen for example the low alkyl esters which also have general formula I or such functional derivatives of free carboxylic acids of the general formula I, which can be easily obtained analogously to various previously mentioned processes for the production of free carboxylic acids and alkyl esters thereof by using other starting materials and/or modifications of the given processes. This is particularly true for nitriles, but also for amides as well as for esters with other hydroxy compounds such as low alkanols.

Preferably according to the process a starting compound of the general formula X

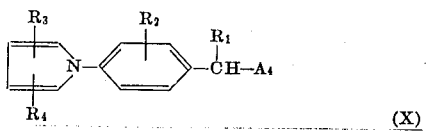

(X)

in which $A_3$ represents the cyano group, an optionally substituted carbamoyl group or a carboxylic acid ester group or imido ester group, particularly the cyano or carbamoyl group, and $R_1$, $R_2$, $R_3$ and $R_4$ have the meanings given in formula I, is hydrolyzed in an alkaline or acid medium, and if desired, the carboxylic acid falling under general formula I is liberated from the salt obtained or a carboxylic acid so obtained is converted into a salt with an inorganic or organic base.

Nitriles, and esters, i.e., apart from low alkyl esters for example cycloalkyl esters and phenyl esters, as well as N,N-disubstituted amides especially low N,N-dialkyl amide, pyrrolidide, piperidide and morpholide, may also be obtained, and can be used as starting materials for the hydrolysis, for example, by a method analogous to the first mentioned process for the production of compounds of general formula I, by using the corresponding functional derivative instead of the free carboxylic acids or their low alkyl esters of the general formula I. Starting materials of the general formula X in which $R_1$ represents a low alkyl group, alkenyl group or alkinyl group, are obtained analogously to the fourth production process. Especially important is the use of this process for the production of nitriles which are derived from the carboxylic acids having the general formula I. Thereby, as in the production of alkyl esters, in relation to the nitrile an equimolar amount of an alkaline condensing agent is to be used. Examples of such agents are: sodium amide, lithium hydride, sodium hydride, butyl lithium, phenyl lithium, triphenyl-methyl sodium, sodium methylate, potassium methylate, sodium isopropylate, sodium-tert.amylate, potassium hydroxide or sodium hydroxide, and as reaction medium for example, inert organic solvents such as diethylether, benzene and toluene, or, together with the above mentioned alkali metal alcoholates or alkali metal hydroxides as condensing agent, also low alkanols such as ethanol or methanol. Also analogous to a modification of the fifth mentioned process, nitriles of the general formula X can be produced instead of the free carboxylic acids and alkyl esters, by decarboxylating the corresponding nitrilic acids instead of the free dicarboxylic acids or dicarboxylic acid monoalkyl esters of the general formula VIIa. The compounds mentioned are in turn obtained for example by partial hydrolysis of corresponding cyano acetic acid (lower)alkyl esters, by means of sodium hydroxide solution, at room temperature or slightly raised temperature. The nitrile of the corresponding carboxylic acid of the general formula I is obtained analogously to the fifth mentioned process by reacting 2-[p-(1—PYRRYL)-phenyl]-acetylacetonitrile, which can be substituted according to the definition of $R_1$, $R_2$ and $R_3$, with an anhydrous alkali alcoholate solution. Finally, nitriles of carboxylic acids having the general formula I, which nitriles also have the general formula X and are suitable for hydrolysis, are obtained by reacting p-(1-pyrryl)-benzyl halides which are substituted according to the definition of $R_1$, $R_2$, $R_3$ and $R_4$, with alkali metal cyanides. Instead of hydrolyzing nitriles of the general formula X, directly to carboxylic acids of the general formula I, they can first be converted into the corresponding amides which also have the general formula X by treating them with alkaline hydrogen peroxide solution and then hydrolyzing if necessary in the same operation, to the carboxylic acids of the general formula I. The imido esters or hydrochlorides thereof which can also be used as starting materials of the general formula X are formed by the successive reaction of hydrogen chloride and a low alkanol on the corresponding nitrile in an anhydrous medium, especially in absolute ether.

According to a ninth process carboxylic acids having the narrower general formula Ia are obtained by heating a compound of the general formula XI

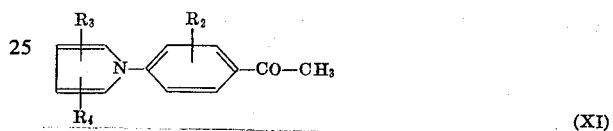

(XI)

in which $R_2$, $R_3$ and $R_4$ have the meanings given in formula I, with ammonium polysulfide or ammonia or with a primary or secondary amine and sulphur according to the methods of Willgerodt and Willgerodt-Kindler, hydrolyzing the amide, or optionally mono- or disubstituted thioamide, so obtained, if desired, liberating the carboxylic acid having the general formula I from the salt so obtained and converting it into a salt with an inorganic or organic base, if desired. The reaction of a compound of the general formula XI with ammonium polysulphide is carried out for example, in a medium in which one, or preferably both, reaction components are at least partially soluble, such as dioxan, in a closed vessel at temperatures of about 160° – 220°. According to Kindler's modification, a compound of the general formula XI can be reacted for example with aqueous or anhydrous ammonia or with a low monoalkylamine or low dialkylamine or piperidine, and with sulphur, also in a closed vessel and optionally in the presence of pyridine at temperatures of about 140° – 180°. According to the most commonly used method of carrying out the Kindler modification, morpholine is used as the amine, and the boiling point of 138° of the morpholine renders the use of pressure vessels unnecessary. For example, the compound of the general formula XI and sulphur are refluxed in excess morpholine for some time, e.g., about 5 – 40 hours and the resulting morpholide of a thio acid corresponding to the general formula XII

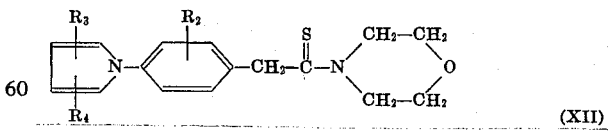

(XII)

wherein $R_2$, $R_3$ and $R_4$ have the meanings given in formula I, is hydrolyzed, e.g., by boiling with alkanolic or alkanolic-aqueous potassium hydroxide solution or sodium hydroxide solution.

The compounds of the general formula XI which are required as starting materials, can be obtained for example by condensing 4'-aminoacetophenone which is optionally substituted according to the definition for $R_2$, with a compound of the general formula III given above analogously to the first mentioned process for the production of compounds of the general formula I.

A 10th process for the production of compounds of the general formula I consists of reacting a compound of the general formula XIII

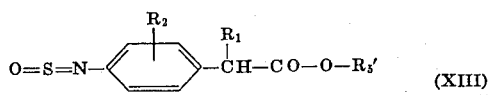

wherein $R_5'$ represents a low alkyl group, and
$R_1$ and $R_2$ have the meanings given under formula I,
with a compound of the general formula XIV

wherein $R_3$ and $R_4$ have the meanings given in formula I, and treating the reaction product of the general formula XV

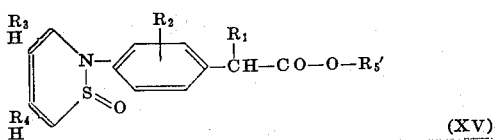

wherein $R_5'$ represents a low alkyl group, and
$R_1$, $R_2$, $R_3$ and $R_4$ have the meanings given in formula I, with an alkali metal hydroxide, if desired liberating the carboxylic acid having the general formula I from the alkali salt so obtained and if desired converting it into a salt with an inorganic or organic base. For example, a compound of the general formula XIII is heated with at least the equimolar amount of a compound of the general formula XIV, such as butadiene, isopren or 2,3-dimethyl-butadiene, for a long period of time in an organic solvent such as acetonitrile or cyclohexane, until the addition is complete. The crude reaction product of the general formula XV is refluxed for example with potassium hydroxide in a low alkanol such as ethanol whereby ring contraction and, at the same time, hydrolysis of the ester group occurs.

The starting materials of the general formula XIII can in turn be obtained by reacting low alkyl esters having the general formula II, with thionyl chloride.

According to an eleventh process a carboxylic acid having the general formula I is converted into a low alkyl ester. For example, a carboxylic acid having the general formula I is reacted with a low diazoalkane, especially diazomethane, or in the presence of a dehydrating agent, such as hydrogen chloride, sulphuric acid, p-toluene sulphonic acid or dicyclohexyl-carbodiimido, with a low alkanol. According to a variation of the esterification the carboxylic acid having the general formula I is first converted into a reactive functional derivative and the latter is reacted, optionally in the presence of an acid binding agent, with a low alkanol. For example, by heating the carboxylic acid with thionyl chloride in the presence of an acid binding agent such as pyridine, or with oxalyl chloride, the corresponding carboxylic acid chloride is obtained which yields the corresponding low alkyl ester on reacting with a low alkanol. According to another variation of the esterification, the carboxylic acid is converted into a metal salt, particularly an alkali metal salt, silver salt or lead salt, and this is then reacted with a reactive ester of a low alkanol, for example with a low alkyl halide, low p-toluene sulphonic acid alkylester or dimethylsulphate. The reaction can optionally be carried out in an organic solvent such as benzene, toluene, ether, tetrahydrofuran or dioxan, and completed by heating.

Finally, the low alkyl esters having the general formula I are produced by a 12th process in which a nitrile of the general formula XVI

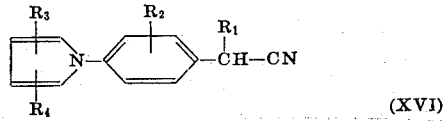

in which $R_1$, $R_2$, $R_3$ and $R_4$ have the meanings given under formula I, is subjected to alcoholysis. The alcoholysis is carried out by simultaneous or successive treatment with a mineral acid, a low alkanol and, optionally, of water. For example, a nitrile of the general formula XVI is treated with hydrogen chloride in the cold, the resulting imide chloride-hydrochloride is reacted with a low anhydrous alkanol to form the corresponding imido-alkylester-hydrochloride, and the latter is decomposed with water to the corresponding low alkylester having the general formula I. The nitriles of the general formula XVI which are required as starting materials are embraced by the above given general formula X and their production is more closely explained following that formula.

According to the invention compounds of the general formula I, wherein $R_1$ represents a low alkyl or alkinyl group are obtained as racemates of the optically active (+) and (−) forms, if in suitable processes therefor, optically active starting materials are not used. The racemates may be resolved into the optically active enantiomers by known means. For example the racemate free carboxylic acids having the general formula I are reacted with optically reactive organic bases, such as (+) and (−)-α-phenyl ethylamine [(+) and (−)-α-methyl-benzylamine], cinchonidine or cinchonine or brucine in organic solvents or in water to pairs of diastereomers, from which the more difficulty soluble one is separated, optionally after concentration and/or cooling. Such organic solutions are chosen wherein the two enantiomeric salts have the greatest difference in solubility possible, so that an optimal separation can be obtained, and optionally the amount of the optically active base used can also be reduced to half of the equimolar amount. For example the salt formation can be performed in a low alkanol, such as ethanol or isopropanol in acetone or dioxane or in a mixture thereof or of further solvents. The optically active forms generally show great differences in their pharmacological properties, for example the (+)-2-[p-(1-pyrryl)-phenyl]-butyric acid shows stronger analgesic and antiphlogistic activities than the (−)-2-[p-(1-pyrryl)-phenyl]-butyric acid.

As stated above the invention also concerns the conversion of the substituted phenyl acetic acids of the invention into salts with inorganic or organic bases, which is effected according to the usual methods well known in the art.

Salts suitable for therapeutic use are those with pharmacologically acceptable inorganic or organic bases, i.e., with bases which, in the usual dosages, have no physiological action of their own or, however, have a desired action, e.g., in forms for parenteral administration, particularly a local anaesthetic action. Suitable salts are, e.g., sodium salts, potassium salts, lithium salts, magnesium salts, calcium salts and ammonium salts, as well as salts with ethylamine, triethylamine, 2-aminoethanol, 2,2'-imino-diethanol, 2-dimethylamino-ethanol, 2-diethylamino-ethanol, ethylenediamine, benzylamine, procaine, pyrrolidine, piperidine, morpholine, 1-ethylpiperidine or 2-piperidino-ethanol or with basic ion exchangers.

The substituted phenyl acetic acids and the esters thereof corresponding to the above formula I, as well as the addition salts of the carboxylic acids having the formula I with inorganic or organic bases, have now been found to exhibit valuable pharmacological properties, in particular anti-inflammatory (antiphlogistic), analgesic and antipyretic activity combined with a favorable therapeutic index. At the same time they are especially distinguished by their good compatibility with the gastric system, particularly in not causing undue gastric irritation as well as by the advantageous fact that they do not influence the central nervous system. These favorable properties render the inventive compounds well suited for the treatment, relief and removal, of pain of various origin, as well as for the treatment and alleviation of acute and chronic inflammatory disorders such as rheumatoid arthritis, rheumatic fever and the like.

Particularly advantageous compounds according to the invention are substituted phenyl acetic acids and esters thereof which correspond to the above formula I
wherein $R_1$ represents hydrogen, straight-chain lower alkyl, straight-chain lower alkenyl or straight-chain lower alkinyl, $R_2$ represents hydrogen, methyl, methoxy, chlorine or bromine, $R_3$ and $R_4$ represent hydrogen, and $R_5$ represents hydrogen or lower alkyl, as well as the addition salts of the carboxylic acids according to the aforegiven definition with inorganic or organic bases. Within this scope compounds wherein $R_2$ represents hydrogen are especially distinguished for their use as analgesics.

Representative of these compounds are particularly

[p-(1-pyrryl)-phenyl]-acetic acid,
2-[p-(1-pyrryl)-phenyl]-propionic acid,
2-[p-(1-pyrryl)-phenyl]-butyric acid,
[3-chloro-4-(1-pyrryl)-phenyl]-acetic acid,
2-[3-chloro-4-(1-pyrryl)-phenyl]-propionic acid,
[p-(1-pyrryl)-phenyl]-acetic acid ethyl ester, and
2-[p-(1-pyrryl)-phenyl]-propionic acid methyl ester, as well as the addition salts of the carboxylic acids among them with inorganic or organic bases.

The anti-inflammatory (antiphlogistic) activity of the inventive compounds can be studied in pharmacological tests, e.g., in the Bolus alba edema test according to G. WILHELMI, Jap. J. Pharmacol. 15, 187 (1965), in the rat.

It is found that, e.g., 2-[p-(1-pyrryl)-phenyl]-propionic acid when administered in this test to rats shows already at dosages of 10 – 50 mg/kg p.o. distinct antiphlogistic action. A similar effect is shown by, e.g., 2-[3-chloro-4-(1-pyrryl)-phenyl]-propionic acid on administration at the same dosage levels, i.e., at 10 – 50 mg/kg p.o. rat.

Moreover, a strong anti-preinflammatory activity (which according to the W.T. BEAVER, Am. J. Med. Sci. 250, 581 (1965) is considered an adjunctive property of mild analgesics) can be demonstrated by the ability of the inventive compounds to delay the appearance of erythema in the skin of guinea pigs exposed to ultraviolet light, when administered before the application of the U.V. radiation.

For example, 2-[p-(1-pyrryl)-phenyl]-propionic acid or, for example, 2-[p-(1-pyrryl)-phenyl]-butyric acid, show in this U.V. erythema test (technique c.f. G. WILHELMI, Schweizerische Medizinische Wochenschrift 79, 577 (1949)) on administration of only 1–2 mg/kg p.o. to guinea pigs 2 hours before the application of the ultraviolet light excellent anti-preinflammatory activity.

In the writhing test according to E. SIEGMUND, R. CADMUS and C. LU, Proc. Soc. Exp. Biol. Med. 95, 729 (1957), distinct analgesic activity is demonstrated by, e.g., [p-(1-pyrryl)-phenyl]-acetic acid or, e.g., 2-[p-(1-pyrryl)-phenyl]-butyric acid or, e.g., [p-(1-pyrryl)-phenyl]-acetic acid ethyl ester, when administered in dosages of about 10–70 mg/kg p.o. to mice.

The excellent compatibility of the inventive compounds with the gastric system can be demonstrated in the test according to G. WILHELMI, Arzneimittelforschung 10, 10 (1960) which comprises administering to a significant number of rats the compounds to be tested in two dosages p.o. (the second dosage about 15 hours after the first), sacrificing the animals 21 hours after the first application of the compounds and macroscopically inspecting a development of stomach-ulcers. For example, 2-[p-(1-pyrryl)-phenyl]-butyric acid administered in two dosages of 100 mg/kg p.o. each, showed in this test no significant gastric irritation.

As mentioned above the compounds according to the invention have an excellent therapeutic index, their toxicity being low. The $LD_{50}$ is, e.g., for [p-(1-pyrryl)-phenyl]-acetic acid as low as > 5,000 mg/kg p.o. mice.

For their intended uses the compounds of the invention are administered orally, rectally or, particularly in the form of aqueous solutions of the salts of the carboxylic acids corresponding to formula I, or in the form of aqueous dispersion, also parenterally, particularly intramuscularly, in amounts depending on the species, age and weight of the subject under treatment as well as on the particular condition to be treated and, of course, the mode of administration; generally the daily doses of the compounds of formula I as well as the pharmaceutically acceptable addition salts of the acids having this formula with inorganic or organic bases vary between 50 and 3,000 mg.

For administration purposes, preferably, the above mentioned therapeutic compositions are used. These compositions are presented for oral, rectal or parenteral administration in dosage units such as tablets, dragees (sugar coated tablets), capsules, suppositories or ampoules, preferably containing as active substance 10 – 500 mg of a compound of the formula I or of a pharmaceutically acceptable addition salt of an acid having this formula with an inorganic or organic base.

As active substance of compounds of the general formula I, wherein $R_1$ is other than hydrogen, as well as the corresponding salts, the racemate as well as an optically active enantiomer can be used.

In unit dosage forms for oral administration the content of active substance is preferably between 10 and 90 percent. For the production of such unit dosage forms, the active substance is combined, for example, with solid, pulverulent carriers, such as lactose, saccharose, sorbitol, mannitol; starches such as potato starch, maize starch or amylopectin, laminaria powder and citrus pulp powder; cellulose derivatives or gelatine, optionally with the addition of lubricants such as magnesium or calcium stearate or polyethylene glycols to form tablets or dragee cores. The latter may be coated, e.g., with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g., to distinguish between different dosages of active substance. Other dosage units suitable for oral administration are hard gelatine capsules as well as soft closed capsules made of gelatine and a softener such as glycerine. The former preferably contain the active substance as a granulate in admixture with lubricants such as talcum or magnesium stearate and, optionally, stabilizers such as sodium metabisulphite ($Na_2S_2O_5$) or ascorbic acid. In soft capsules, the active substance is preferably dissolved or suspended in suitable liquids such as liquid polyethylene glycols, to which stabilizers can also be added.

Examples of dosage units for rectal administration are suppositories which consist of a combination of an active substance with a suppository foundation mass based on natural or synthetic triglycerides (e.g., cocoa butter), polyethylene glycols or suitable higher fatty alcohols, and gelatine rectal capsules which contain a combination of the active substance with polyethylene glycols.

Ampoule solutions for parenteral especially for intramuscular or intravenous administration contain, e.g., a compound of general formula I in a concentration of, preferably, 0.5 to 5 percent as aqueous dispersion prepared with the aid of the usual solubility promoters and/or emulsifying agents as well as, optionally, stabilizers, or they contain an aqueous solution of a pharmaceutically acceptable, water soluble salt of a free acid embraced by the general formula I.

Further parenteral forms for percutaneous application are, e.g., lotions, tinctures or ointments prepared with the usual additives.

The following prescriptions further illustrate the production of different unit dosages and forms of application.

a. 1,000 g of active substance, e.g., 2-[p-(1-pyrryl)-phenyl]-butyric acid are mixed with 550 g of lactose and 292 g of potato starch, the mixture is moistened with an alcoholic solution of 8 g of gelatine and granulated through a sieve. After drying, 60 g of potato starch, 60 g of talcum and 10 g of magnesium stearate and 20 g of highly dispersed silicon dioxide are mixed in and the mixture is pressed into 10,000 tablets each weighing 200 mg and containing 100 mg of active substance. If desired the tablets can be grooved for better adaptation of the dosage.

b. 200 g of active substance, e.g., [p-(1-pyrryl)-phenyl]-acetic acid, are well mixed with 16 g of maize starch and 6 g of highly dispersed silicon dioxide. The mixture is moistened with a solution of 2 g of stearic acid, 6 g of ethyl cellulose and 6 g of stearin in about 70 ml of isopropyl alcohol and granulated through a sieve III (Ph. Helv. V). The granulate is dried for about 14 hours and then pressed again through sieve III–IIIa. It is then mixed with 16 g of maize starch, 16 g of talcum and 2 g of magnesium stearate and pressed into 1,000 dragee cores. These are then coated with a concentrated syrup of 2 g of shellac, 7.5 g of gum arabic, 0.15 g of dyestuff, 2 g of highly dispersed silicon dioxide, 25 g of talcum and 53.35 g of sugar, and dried. The dragees obtained each weigh 360 mg and contain 200 mg of active substance.

c. 50.0 g of 2-[p-(1-pyrryl)-phenyl]-propionic acid are dissolved in a mixture of 232 ml 1N sodium hydroxide solution and 500 ml of pyrogen free boiled water and the solution is made up to 2,000 ml with the same water. The solution is filtered, filled in 1,000 ampoules of 2 ml each and sterilized. One ampoule of 2 ml contains 50 mg of 2-[p-(1-pyrryl)-phenyl]-propionic acid as active substance in the form of its sodium salt.

d. 50 g of 2-[p-(1-pyrryl)-phenyl]-butyric acid and 1,950 g finely ground basic substance for suppositories (e.g., cocoa butter) are thoroughly mixed and then melted. 1,000 suppositories of 2.0 g each are cast from the melt kept homogenous by stirring. Each contains 50 mg of active substance.

e. 60.0 g of polyoxyethylene sorbitan monostearate, 30.0 g of sorbitan monostearate, 150.0 g of paraffin oil and 120.0 g stearyl alcohol are melted together; 50.0 g of [p-(1-pyrryl)-phenyl]-acetic acid (finely pulverized are added and 590 ml water preheated to 40° emulsified therein. The emulsion is stirred until cooled to room temperature and then filled into vials.

The following examples further illustrate the production of the new compounds of general formula I but they in no way limit the scope of the invention. The temperatures are given in degrees Centigrade, percentages are given by weight. Torr means mm Hg.

EXAMPLE 1

179 g (1 mol) of 2-(p-aminophenyl)-butyric acid (Fourneau, Sandulesco, Bl. [4], 452) and 132 g (1 mol) of 2,5-dimethoxy-tetrahydrofuran in 200 ml of glacial acetic acid are refluxed for 30 minutes. The reaction mixture is then distilled from an oil bath, first under 12 Torr and then under high vacuum. The fraction which passes over between 180° – 200° under 0.5 – 1 Torr consists of crude 2-[p-(1-pyrryl)-phenyl]-butyric acid. It crystallizes during the distillation, M.P. 105°–110°. On recrystallizing from benzene/cyclohexane (1:1, 660 ml) and decoloring with active charcoal, washing the crystals with the same mixture of solvents (110 ml) and drying for 15 hours at 50° under 0.5 Torr, pure 2-[p-(1-pyrryl)-phenyl]-butyric acid is obtained which melts at 112°–113°. It has an immediate positive reaction to Ehrlich reactant (p-dimethylamino-benzaldehyde).

On reacting p-amino-hydrotropic acid (rac., F. Nerdel, H.Pawlowski, Chem. Ber. 87, 217–220 (1954)) with the equimolar amount of 2,5-dimethoxy-tetrahydrofuran, p-(1-pyrryl)-hydratropic acid is obtained in an analogous manner; M.P. 166°–168°.

If 2-(p-aminophenyl)-butyric acid is reacted with an equimolar amount of 2,5-dimethoxy-3-methyl-tetrahydrofuran in an analogous manner to the first paragraph, 2-[p-(3-methyl-1-pyrryl)-phenyl]-butyric acid with M.P. 138°–139° is obtained. The 2,5-dimethoxy-3-methyl-tetrahydrofuran, B.P. 157°–158°/760 Torr, $N_D^{25}$ 1.4169, is produced starting from 3-methyl-furan by conversion into the 2,5-dimethoxy-3-methyl-2,5-dihydrofuran. B.P. 171°–172°/760 Torr, $N_D^{25}$ 1.4358, analogously to the corresponding 2-methyl compound [Clauson-Kaas, Limborg, Dietrich, Acta Chem. Scand. 6, 545 (1952)] and reduction analogously to the production of the 2,5-dimethoxy-2-methyl-tetrahydrofuran Clauson-Kaas Elming, Acta Chem. Scand. 6, 867 (1952)].

By reaction of 2-(p-aminophenyl)-valeric acid with the equimolar amount of 2,5-dimethoxy-tetrahydrofuran the 2-[p-(1-pyrryl)-phenyl]-valeric acid, M.P. 108°–109° is also analogously obtained.

EXAMPLE 2

30.2 g (0.20 mol) of (p-aminophenyl)-acetic acid [Radziszewski, Ber. 2, 209; Bedson, J. Chem. Soc. 37, 92] and 26.4 g (0.20 mol) of 2,5-dimethoxy-tetrahydrofuran in 40 ml of acetic acid are refluxed for 30 minutes. After cooling, the reaction solution is poured into 160 ml of water. The precipitated crystals are filtered off, washed with water and dried for 15 hours at 70°. The brown powder obtained is extracted with benzene in a Soxhlet apparatus. On concentrating the extract, the [p-(1-pyrryl)-phenyl]-acetic acid which melts at 180°–182° and has a positive Ehrlich reaction is obtained.

EXAMPLE 3

3.58 g (0.020 mol) of 2-(p-aminophenyl)-butyric acid and 2.28 g (0.020 mol) of acetonyl-acetone in 7 ml acetic acid are refluxed for 30 minutes. The clear, red reaction mixture is evaporated to dryness on the water-bath (100°) under 10 Torr. The solid residue (5.3 g) is dissolved in 150 ml of ether, the ether solution is washed with 15 ml 3-N hydrochloric acid and several times with water, dried over magnesium sulphate and concentrated. The reddish brown, crystalline residue which melts at 143° is sublimated at 140°–150° under 0.1 Torr. The sublimate is recrystallized from benzene-cyclohexane and then from methanol-water and then once more sublimated, whereby 2-[p-(2,5-dimethyl-1-pyrryl)-phenyl]-butyric acid is obtained, M.P. 154°–155°.

EXAMPLE 4

21.4 g of (p-aminophenyl)-acetic acid-ethylester, 15.9 g of 2,5-dimethoxy-tetrahydrofuran and 30 ml of glacial acetic acid are refluxed for 1½ hours. The solvent is distilled off under water jet vacuum. The residue is distilled in high vacuum, whereupon the [p-(1-pyrryl)-phenyl]-acetic acid-ethylester passes over at 122°–130°/0.02 Torr. After recrystallization from methanol it melts at 49°–51°.

EXAMPLE 5

3.58 g (0.02 mol) of 2-(p-aminophenyl)-butyric acid and 2.10 g (0.01 mol) of mucic acid are dissolved by boiling in 50 ml of water. The clear solution is evaporated to dryness and the residue is sublimated under high vacuum (0.4 Torr) at 170°–230°. The pale yellow sublimate is crystallized from benzene whereupon 2-[p-(1-pyrryl)-phenyl]-butyric acid is obtained, M.P. 109°–112°. After recrystallization from ether, the melting point is 112°–113°.

EXAMPLE 6

To 150 ml of liquid ammonia is added while stirring enough of 1.45 g (0.063 mol) of sodium to produce a distinctly blue solution, a few crystals of iron(III)nitrate are added thereto and then the remaining sodium and stirring is continued till the blue color has disappeared and a grey sodium-amide suspension is formed (see Organic Reactions 8, 122[1954]). 6.03 g (0.025 mol) of [p-(1-pyrryl)-phenyl]-acetic acid (cf. Example 2) is added to this suspension. The mixture is refluxed for 30 minutes while stirring. A solution of 2.73 g (0.025 mol) of ethylbromide in 5 ml ether is added dropwise within 2 minutes, and the reaction mixture is further refluxed and stirred for 30 minutes. 3.8 g (0.07 mol) of ammonium chloride are added and the ammonia is evaporated with the gradual addition of 150 ml of ether. The practically ammonia-free ethereal solution is extracted with 25 ml of 3-N hydrochloric acid. The aqueous phase is in turn extracted twice with ether. The ether phases are combined, dried over magnesium sulphate and evaporated to dryness. The residual crude product melts partially at 109°–112°. It is then recrystallized from about 20 ml benzene-cyclohexane (1:1) and then from about 35 ml methanol-water (3:2), whereupon 2-[p-(1-pyrryl)-phenyl]-butyric acid is obtained, M.P. 112°–113°.

Analogously, by using 0.025 mol of n-propyl-bromide, isopropyl-bromide, allyl-bromide or 2-propinyl-bromide are obtained 2-[p-(1-pyrryl)-phenyl]-valeric acid, M.P. 108°–109°,
2-methyl-2-[p-(1-pyrryl)-phenyl]-butyric acid, M.P. 148°–129°,
2-[p-(1-pyrryl)-phenyl]-4-pentenic acid, M.P. 102°–105°, or
2-[p-(1-pyrryl)-phenyl]-4-pentinic acid, M.P. 122°–123° respectively.

EXAMPLE 7

Analogously to Example 6, 10.1 g (0.05 mol) of [p-(1-pyrryl)-phenyl]-acetic acid are reacted with 6.85 g (0.05 mol) of 1-bromine-butane, using a sodium-amide suspension prepared from 2.9 (0.125 mol) of sodium and 250 ml of liquid ammonia. The crude product is distilled in high vacuum and the fraction which passes over under 0.2 Torr at 171°–180° is crystallized from a mixture of 40 ml of petroleum ether (B.P. up to 50°) and 20 ml cyclohexane, and then from a mixture of 15 ml each of petroleum ether and cyclohexane and finally from 20 ml methylcyclohexane, whereupon pure 2-[p-(1-pyrryl)-phenyl]-hexanoic acid is obtained as yellowish-white crystals, M.P. 96°–98°.

EXAMPLE 8

Analogously to Example 6, 15.1 g (0.075 mol) of [p-(1-pyrryl)-phenyl]-acetic acid are reacted with 13.7 g (0.097 mol) of methyl-iodide using a sodium-amide suspension prepared from 4.32 g (0.188 mol) sodium and 300 ml of liquid ammonia. After in all six crystallizations from benzene, methanol-water and methanol the crude product affords the 2-[p-(1-pyrryl)-phenyl]-propionic acid as white crystals, M.P. 168°–169°.

EXAMPLE 9

7.4 g p-(1-pyrryl)-benzoic acid with 3.3 ml of thionylchloride and 4.8 g of pyridine in 100 ml methylenechloride are heated to boiling under reflux for 3 hours in a nitrogen atmosphere. The reaction mixture is then evaporated in vacuum and the residue is mixed with 100 ml tetrahydrofuran, whereby a part thereof remains undissolved. The resulting suspension of crude acid chloride is added dropwise within an hour, while cooling with ice, to a mixture of 200 ml 0.6-N ethereal diazomethane solution and 50 ml of dioxane and the whole is then stirred for 18 hours at room temperature. A solution is thus formed which is freed from a slight turbidity by filtration through Hyflo (diatomaceous earth), and the filtrate is evaporated under reduced pressure at 30°.

The residual, raw 4'-(1-pyrryl)-2-diazo-acetophenone is dissolved in 180 ml abs. methanol, the solution is heated to boiling under reflux, and is mixed portionwise with silver-oxide (produced from 2 g of silver nitrate and washed with methanol) until no further gas evolution can be determined, which takes about 4 hours. The silver precipitate is filtered off, the filtrate is evaporated under vacuum and the partially crystalline residue of crude [p-(1-pyrryl)-phenyl]-acetic acid-methylester is refluxed for 3 hours with a solution of 4 g potassium hydroxide in 5 ml of water and 50 ml of methanol. After distilling the solvent off under vacuum, the residue is dissolved in 30 ml of methanol-water (1:1) and neutralized with glacial acetic acid. The crude [p-(1-pyrryl)-phenyl)]-acetic acid so obtained has a M.P. of 170°–180°. By recrystallizing several times from carbon tetrachloride-ethyl acetate the melting point is raised to 180°–182°.

The p-(1-pyrryl)-benzoic acid used as starting material is obtained as follows:

a. The p-(1-pyrryl)-benzoic acid-ethylester is produced analogously to the 4-(1-pyrryl)-acetophenone [cf. Example 12a)], from 2,5-dimethoxy-tetrahydrofuran and 4-amino-benzoic acid-ethyl ester, M.P. 75°–76° (from methanol), B.P. 140°–145°/0.01 Torr.

b. A solution of 32 g of p-(1-pyrryl)-benzoic acid-ethylester and 12 g of sodium hydroxide in 600 ml ethanol is heated to boiling under reflux for 2 hours, whereupon a crystalline precipitate gradually forms. The reaction mixture is then concentrated to about 200 ml under reduced pressure and the precipitated sodium salt is brought to a solution by the addition of 200 ml of water. This solution is then slowly brought to pH 5 by means of glacial acetic acid while stirring, whereupon the desired p-(1-pyrryl)-benzoic acid precipitates as a fine, thick slurry. The precipitate is filtered off under suction, washed portionwise with 100 ml of water and dried for 7 hours at 70° in a thermal vacuum dessicator. The p-(1-pyrryl)-benzoic acid so obtained melts at 265°–270° with decomposition.

EXAMPLE 10

A solution of 40g of [p-(1-pyrryl)-phenyl]-acetic acid-ethylester (cf. Example 4) and 7.2 g of sodium hydroxide in a mixture of 200 ml each of water and ethanol, is refluxed for 5 hours. After evaporation in vacuum, the residue is dissolved in about 400 ml of water and extracted with 100 ml of ether. The aqueous phase is separated off, filtered and brought to pH 3-4 with about 6-N hydrochloric acid. The precipitated crystals are filtered off under suction, washed with water and dried for 14 hours at 70°, [p-(1-pyrryl)-phenyl]-acetic acid, M.P. 180–182°which sinters at 178° is so obtained. By recrystallization from carbon tetrachloride-methanol small colorless plates are obtained, M.P. 181°–182°.

EXAMPLE 11

9.10 g (0.05 mol) of [p-(1-pyrryl)-phenyl]-acetonitrile are refluxed for 30 hours in a solution of 14 g (0.25 mol) of potassium hydroxide in 70 ml of methanol and 10 ml of water. After cooling, the reaction solution is mixed with water and made acid with conc. hydrochloric acid. The carboxylic acid which separates off is taken up in ether and the ethereal solution is dried and concentrated. The residue is recrystallized from carbon tetrachloride-ethylacetate several times, whereupon the [p-(1-pyrryl)-phenyl]-acetic acid is obtained, M.P. 180°–182°.

The new starting compound [p-(1-pyrryl)-phenyl]-acetonitrile is produced as follows:

a. 17.8 g (0.135 mol) of (p-aminophenyl)-acetonitrile and 17.8 g (0.135 mol) of 2,5-dimethoxy-tetrahydrofuran are refluxed for 2 hours in 47 ml of acetic acid. The dark reaction mixture is then evaporated on the water-bath (100°) under 10 Torr. The partially crystallized residue of 24.5 g is continuously extracted with ether for 3 hours in a Soxhlet apparatus. The ethereal suspension so obtained is concentrated to 50 ml and cooled to −20°. The substance which crystallizes out is filtered off, washed twice with ether and dried, whereupon [p-(1-pyrryl)-phenyl]-acetonitrile is obtained as light brown crystals, M.P. 100°–102°. By recrystallization from 260 ml isopropanol, while decoloring with active charcoal, white, pure substance is obtained, M.P. 104°–105°, which has a positive Ehrlich reaction.

EXAMPLE 12

3.7 g (0.02 mol) of 4'-(1-pyrryl)-acetophenone, 1.0 g of sulphur powder and 4 ml of morpholine are refluxed for 15 hours. The dark reaction mixture is thereupon mixed with 20 ml ethanol and 30 ml 2-N sodium hydroxide solution and refluxed for a further 8 hours. The volatile portions are then evaporated in vacuum and the residue is dissolved in 30 ml of water and treated with active charcoal. The solution is then brought to pH 1-2 with concentrated hydrochloric acid. The resulting precipitate is filtered off, washed with water till it shows only pH 3-4 and then dried in a thermal vacuum dessicator at about 100 Torr and 50°. 4.0 g of [p-(1-pyrryl)-phenyl]-acetic acid are thus obtained as crystals with M.P. 160°–170°. Further purification is carried out by reprecipitation (sodium hydroxide; hydrochloric acid) and recrystallization (once from ethanol and then once from carbon tetrachloride-methanol); [p-(1-pyrryl)-phenyl]-acetic acid is so obtained, M.P. 180°–182°. Analogously when using 0.02 mol of the substituted 4-pyrryl-acetophenone, mentioned under a), the following are obtained:

[3-bromo-4-(1-pyrryl)-phenyl]-acetic acid,
[3-methyl-4-(1-pyrryl)-phenyl-acetic acid, B.P. 180°/0.02 Torr.; $n_D^{22}$ 1,5785,
[3-methoxy-4-(1-pyrryl)-phenyl]-acetic acid, M.P. 124°–126°(from Isopropanol)
[2-chloro-4-(1-pyrryl)-phenyl]-acetic acid.

The starting materials are produced as follows:

a. 13.5 g of 4'-amino-acetophenone and 13.2 g of cis, trans 2,5-dimethoxy-tetrahydrofuran are refluxed for 2½ hours in 25 ml of glacial acetic acid. WHen left standing overnight, crystals separate off from the dark reaction mixture. These are filtered off and washed with ether. 4'-(1-pyrryl)-acetophenone is obtained, M.P. 118°–122°. After crystallization from isopropanol the melting point is 120°–122°.

In an analogous manner, from 21.4 g 3'-bromo-4'-amino-acetophenone there is obtained 3'-bromo-4'-(1-pyrryl)-acetophenone,
starting from 14.9 g 3'-methyl-4'-amino-acetophenone there is obtained 3'-methyl-4'-(1-pyrryl)-acetophenone,
starting from 16.5 g 3'-methoxy-4'-amino-acetophenone [see (b) and (c)]there is obtained 3'-methoxy-4'-(1-pyrryl)-acetophenene, B.P. 220°/0.05 Torr. M.P. 58°–64° and
starting from 16.9 g 2'-chloro-4'-amino-acetophenone (prepared from 3'-chloro-acetanilide and acetylchloride analogous to 2,2'-dichloro-4'-amino-acetophenone [Kunckell et al., Ber. 40, 3394–3397 (1907) ]There is obtained 2'-chloro-4'-(1-pyrryl)-acetophenone.

b. In a 250 ml stirring flask with a stirrer, a dropping funnel and a reflux condenser 2.7 g of magnesium filings with 2.5 ml of abs. ethanol are reacted with addition of a trace of iodine in 0.25 ml of carbontetrachloride. After the beginning of the reaction it is diluted with 37.5 ml of ether and a solution of 17.6 g of malonic acid ethyl ester, 10 ml of abs. ethanol and 12.5 ml of abs. ether is so added that the reaction mixture is kept boiling without external heating. It is refluxed for 3 hours until all of the magnesium is dissolved. To the cooled clear solution there is added while stirring vigorously, an ethereal solution of 21.5 g of crude 4-nitro-3-methoxy-benzoylchloride which has been previously refluxed for two hours with 19.7 g of 4-nitro-3-methoxy-benzoic acid in 50 ml of thionylchloride and with distilling off of the thionylchloride in vacuo. The reaction product separates as a viscous mass. The reaction mixture is refluxed for another half hour, cooled on ice and decomposed with about 100 ml of 2-N sulphuric acid until the whole is dissolved. The other phase is separated, combined with an ethereal extract of the aqueous phase, washed with water, dried over sodium sulphate and evaporated. The oily residue is taken up in a solution of 30 ml of glacial acetic acid, 3.75 ml of conc. sulphuric acid and 20 ml of water and refluxed for 5 hours until the evolution of carbon dioxide is completed. Then the solution is poured on ice, made alkaline with 20 percent sodium hydroxide solution and extracted several times with ether. The combined ether extracts are washed with water, dried over sodium sulphate, and the ether is distilled off. There is obtained crude 4-nitro-3-methoxy-acetophenone which melts after recrystallization from ether at 66°–68°.

c. 7.35 g of 4-nitro-3-methoxy-acetophenone are dissolved in 90 ml of glacial acetic acid. The solution is heated to about 70° on a water bath and a warm solution of 30 g of tin (II) chloride in 36 ml conc. hydrochloric acid is added all at once. The reduction occurs immediately with boiling of the solution. The reaction mixture is allowed to cool to room temperature, then poured on ice and made alkaline with 40 percent sodium hydroxide solution. The reaction product is extracted with ether. The ether extract is washed with water, dried over sodium sulphate and evaporated to dryness. By crystallization of the residue from ether-petroleum ether there is obtained 4-amino-3-methoxy-acetophenone as yellow prisms, M.P. 66°–87.

EXAMPLE 13

21.2 g of 2-(p-sulphinylimino-phenyl)-butyric acid-ethyl-ester and 12 g of 2,3-dimethyl-1,3-butadiene are refluxed in 50 ml acetonitrile for 17 hours and then the reaction mixture is evaporated in vacuum. The dark residue is refluxed for 2 hours with a solution of 30 g of potassium hydroxide in 250 ml of ethanol and after mixing with 200 ml of water is concentrated in vacuo to about 200 ml. The solution is treated with charcoal, brought to pH 1–2 with 2-N hydrochloric acid and cooled. The resulting crystalline precipitate is filtered off under suction, washed neutral with water and dried in a thermal vacuum dessicator. Crude 2-[p-(3,4-dimethyl-1-pyrryl)-phenyl]-butyric acid is so obtained, M.P. 115°–130°. On recrystallization from isopropanol-water and then from carbon tetrachloride, the melting point rises to 131°–132°.

If the 2,3-dimethyl-1,3-butadiene is replaced by 11.5 g of isoprene (2-methyl-1,3-butadiene), the 2-[p-(3-methyl-1-pyrryl)-phenyl]-butyric acid is obtained in an analogous manner, M.P. 138°–139°.

In an analogous manner from 1,3-butadiene the 2-[p-(1-pyrryl)-phenyl]-butyric acid is obtained, M.P. 112°–113°.

Also in an analogous manner [p-(3,4-dimethyl-1-pyrryl)-phenyl]-acetic acid, M.P. 174°–183° is obtained from 20.2 g of (p-sulphinyliminophenyl)-acetic acid-ethylester, 14 g of 2,3-dimethyl-1,3-butadiene, 0.1 g of hydroquinone and 50 ml of acetonitrile. After recrystallization from methanol, the acid melts at 183°–185°.

The production of the new starting 2-(p-sulphinylimino-phenyl)-butyric acid-ethylester can be carried out in the following manner:

a. A mixture of 7.5 ml of thionylchloride and 10 ml of benzene is added dropwise while stirring and cooling with ice at 10°–20°, to a solution of 20.7 g of 2-(4-aminophenyl)-butyric acid-ethylester in 100 ml benzene. Thereupon, the reaction mixture is heated to boiling in 15 minutes under reflux while stirring. The residue which remains after evaporation of the solvent under reduced pressure yields, after distillation in high vacuum, 2-(p-sulphinylimino-phenyl)-butyirc acid-ethylester as a yellow oil, B.P. 125°/0.1 Torr.

In an analogous manner the new starting (p-sulphinylimino-phenyl)-acetic acid-ethylester. B.P. 110°/0.1 Torr is produced from 17.9 g of (p-aminophenyl)-acetic acid-ethylester.

EXAMPLE 14

11.5 g (0.050 mol) of 2-[p-(1-pyrryl)-phenyl]-butyric-acid (cf. Example 1) are refluxed for 4 hours in a solution of 2 ml of concentrated sulphuric acid in 65 ml of methanol. The reaction mixture is then cooled to 0° and poured onto ice water. The crude 2-[p-(1-pyrryl)-phenyl]-butyric acid-methyl-ester which precipitates in crystal form is filtered, washed with ice cold sodium carbonate solution and then with water and dried in vacuum at room temperature. After recrystallization from methanol it melts at 56°–58°.

In an analogous manner, using the same amount of ethanol instead of methanol, the crude 2-[p-(1-pyrryl)-phenyl]-butyric acid-ethylester is obtained which is purified by distillation in high vacuum; B.P. 118°–123°/ 0.1 Torr, $n_D^{25}$1.5502, M.P. 29°–31°.

If 10.1 g (0.05 mol) of [p-(1-pyrryl)-phenyl]-acetic acid with 65 ml of methanol and 2 ml of conc. sulphuric acid are also treated in an analogous manner, [p-(1-pyrryl)-phenyl]- acetic acid-methylester is obtained, B.P. 120°–126°/ 0.1 Torr, $n_D^{25}$ 1.5770, M.P. 43°–44°.

If 10.1 g of [p-(1-pyrryl)-phenyl]-acetic acid with 65 ml ethanol and 2 ml conc. sulphuric acid are also treated in an analogous manner, [p-(1-pyrryl)-phenyl]-acetic acid ethylester is obtained, B.P. 129°–131°/ 0.2 Torr, $n_D^{25}$ 1.5529, M.P. 55°–56°.

Also in an analogous manner, using 10.8 g (0.05 mol) of 2-[p-(1-pyrryl)-phenyl]-propionic acid, 65 ml of methanol and 2 ml of concentrated sulphuric acid, the 2-[p-(1-pyrryl)-phenyl]-propionic acid-methylester is obtained, B.P. 123°/0.008 Torr, $n_D^{25}$ 1.5680, M.P. 40°–41°.

EXAMPLE 15

31.8 g of [p-(1-pyrryl)-phenyl]-acetic acid (cf. Example 2) are dissolved in 200 ml of anhydrous methanol and refluxed for 4 hours with 6 ml of concentrated sulphuric acid. The solvent is distilled off in vacuum at a temperature of at most 40°. The residue is taken up in about 200 ml of methylene chloride and made alkaline, while cooling with ice, with 5-N sodium hydroxide. The organic phase is separated off, washed with water and dried over anhydrous magnesium sulphate. The oil which remains after evaporation of the solvent is distilled at high vacuum. The fraction 126°–138°/0.3 Torr solidifies in the cold. By recrystallization from carbon tetrachloride-ligroin. [p-(1-pyrryl)-phenyl]-acetic acid-methylester is obtained as colorless crystals, M.P. 43°–44°.

EXAMPLE 16

3g of [p-(1-pyrryl)-phenyl]-acetonitrile (cf. Example 11a) are dissolved in 30 ml of methylene chloride, mixed with 30 ml of 4.4-N hydrochloric acid in methanol and left standing for 2½ days at 0°–4°. The dark reaction mixture is concentrated under reduced pressure, the residue dissolved in 100 ml of methylene chloride, with ice-cooling, brought to a pH of 8–9 with 2-N sodium hydroxide and vigorously shaken for 2–3 minutes. The organic phase is separated off, washed with water, dried over anhydrous magnesium sulphate and evaporated in vacuo. The remaining black residue is distilled in high vacuum and yields [p-(1-pyrryl)-phenyl]-acetic acid-methylester as a yellowish oil, B.P. 148°–150°/1.5 Torr, which begins to crystallize after a short time, After crystallization from carbon tetrachloride-ligroin, the ester melts at 43°–44°.

EXAMPLE 17

6.9 g of 2-[p-(1-pyrryl)-phenyl]-butyric acid (cf. Example 1) are dissolved in 20 ml of benzene by warming and mixed with a solution of 2.7 g of 2-dimethylamino-ethanol in 2 ml of benzene. On rubbing, the salt crystallizes out. It is filtered off by suction, washed with 5 ml of cold ether and dried. After recrystallization from 30 ml benzene and drying at room temperature in high vacuum, the 2-dimethylaminoethanol-salt of the 2-[p-(1-pyrryl)-phenyl]-butyric acid metals at 96°–100°, after sintering at 91°.

EXAMPLE 18

1.9 g of methyl-[p-(1-pyrryl)-phenyl]-malonic acid-diethylester, 1.4 g of potassium hydroxide, 5 ml of water and 15 ml of n-butanol are heated to boiling for 3 hours while stirring. The solvent is evaporated off at about 12 Torr and the concentrate is dissolved in 30 ml of water. The aqueous solution is extracted with 15 ml of ether and after filtration is brought to a pH 1–2 with 2-N hydrochloric acid. The fine, colorless precipitate is filtered by suction and washed with water. The 2-[p-(1-pyrryl)-phenyl]-propionic acid so obtained melts at 168°–169°.

Analogously there is obtained 2-[p-(1-pyrryl)-phenyl]-butyric acid, M.P. 112°–113°.

The new di-substituted malonic acid-diethylester necessary as starting material is produced as follows:

a. A mixture of 80 g of [p-(1-pyrryl)-phenyl]-acetic acid-ethylester and 280 ml of diethyl carbonate are heated to 80°. Between 75° and 80° a solution of 10.0 g of sodium in 450 ml of abs. ethanol is quickly added while stirring. The ethanol is thereupon distilled off from the reaction mixture. By gradually raising the bath temperature to 230° distillation is continued until the vapor temperature reaches 120°. 200 ml of diethyl carbonate are now added and distilled off until the vapor temperature reaches 123°. The contents of the flask are cooled in ice and neutralized with a mixture of 30 ml of glacial acetic acid and 800 ml ice-water. The mixture is extracted twice, each time with 400 ml of ether, the ether solution washed with 5 percent potassium bi-carbonate solution, dried over sodium sulphate and concentrated, whereupon the [p-(1-pyrryl)-phenyl]-malonicacid-diethylester crystallizes out. It is filtered off by suction and washed with 50 ml of a mixture of petroleum ether - benzene (2:1) and dried in vacuum. 88.5 g of the desired ester are obtained as light beige crystals, M.P. 76°–81°. After crystallization from methanol the melting point rises to 80°–83°.

b. 2.0 g of sodium is dissolved in 80 ml of abs. ethanol. The solution is heated to 50° and mixed with a 50°-warm solution of 24.0 g of [p-(1-pyrryl)-phenyl]-malonic acid-diethylester in 60 ml of abs. ethanol. The mixture is stirred for half an hour at 40°–50° and then dropwise, quickly added to 16.0 g of methyl-iodide. Thereupon, the reaction mixture is refluxed for 4 hours while stirring and thereafter again 16.0 g of methyl iodide are added. After further refluxing for 2 hours, the reaction mixture is concentrated under reduced pressure, taken up in 300 ml of ether and washed with 40 ml each of 10 percent sodium bisulphite solution and water. The ether solution is dried over sodium sulphate and evaporated whereupon 11.2 g of a yellow oil remain. This is dissolved in 100 ml of water with 6.8 g of potassium hydroxide, refluxed for 2 hours, whereby the monosubstituted malonic acid diethylester (starting material) is hydrolyzed, while the required reaction product remains unchanged. After cooling, the solution is extracted twice, each time with 200 ml of ether. The ethereal solution is washed neutral with water and concentrated.

The oil which remains crystallized spontaneously. By recrystallization from benzene-petroleum ether, methyl-[p-(1-pyrryl)-phenyl]-malonic acid diethyl ester is obtained as colorless crystals, M.P. 57°–58°.

In an analogous manner by using 17.6 g of ethyl iodide twice the new ethyl-[p-(1-pyrryl)-phenyl]-malonic acid diethyl ester is produced. The oily crude product is purified by distillation, B.P. 215°/ 0.05 Torr. $n_D^{23}$ 1.5415.

EXAMPLE 19

Hydrogen sulphide is introduced into a suspension of 4 g of sulphur powder in 60 ml of conc. aqueous ammonia solution until the sulphur dissolves. Then a solution of 6.0 g of p-(1-pyrrl)-acetophenone in 24 ml of dioxane is added and the reaction mixture is heated for 12 hours in an autoclave to 150°–160°. The partially crystalline reaction is mass then mixed with 100 ml of 5-N sodium hydroxide and 30 ml of isopropanol and refluxed for 14 hours. The reaction mixture is diluted with 200 ml of water and the organic solvents are evaporated off under reduced pressure. The remaining aqueous solution is stirred with active charcoal, filtered through Hyflo (diatomaceous earth) and made acid with 2-N hydrochloric acid. The [p-(1-pyrryl)-phenyl]-acetic acid obtained as crystals is dissolved in 2-N sodium carbonate solution, again precipitated with 2-N hydrochloric acid and recrystallized from isopropanol, whereupon it melts at 180°–182°.

EXAMPLE 20

12.1 g of [p-(1-pyrryl)-phenyl]-acetic acid, 27 g of n-butanol, 120 ml of benzene and 100 mg of p-toluene-sulphonic acid are refluxed for 14 hours in a water separator. The solution is washed with 50 ml of 5 percent sodium carbonate solution, dried over anhydrous sodium sulphate and concentrated in vacuum. The residual oil crystallizes after a short time. The crystals are filtered off under suction and recrystallized from isopropanol-benzene. 7.0 g of [p-(1-pyrryl)-phenyl]-acetic acid-n-butylester are obtained, M.P. 40°–41°.

EXAMPLE 21

6.0 g of 2-[p-(1-pyrryl)-phenyl]-butyric acid are dissolved in 10 ml of 2-N potassium hydroxide, the solution is filtered and concentrated under reduced pressure. The crystalline residue is recrystallized from dioxane-isopropanol (10:1). The potassium salt of 2-[p-(1-pyrryl)-phenyl]-butyric acid so obtained melts at 255°, decomposition from 230°.

EXAMPLE 22

5.7 g of [p-(1-pyrryl)-phenyl]-acetic acid are suspended in 40 ml of isopropanol. By addition of 8 ml of triethylamino a homogeneous solution is obtained. This is mixed with 20 ml ether and filtered. After the addition of enough petroleum ether (B.P. 40°–60°) to remove the resulting turbidity, the salt gradually crystallizes out on cooling. After drying for 12 hours at 200 Torr, the triethylammonium salt of the [p-(1-pyrryl)-phenyl]-acetic acid melts at 67°–73°.

EXAMPLE 23

19.8 g (0.15 mol) of 2,5-dimethoxy-tetrahydrofuran, 27.8 g (0.15 mol) of (4-amino-3-chlorophenyl)-acetic acid and 40 ml of acetic acid are refluxed for 10 minutes. The reaction mixture is then cooled to room temperature, added to 500 ml of ether and 150 ml of 2-N hydrochloric acid, the mixture is agitated and decanted from a somewhat sticky, black substance. The ethereal phase is separated off, washed twice with 50 ml of 1-N hydrochloric acid each time, dried over magnesium sulphate and concentrated. The oily residue of 19.1 g (54 percent of the theoretical yield) is distilled in high vacuum. The [3-chloro-4-(1-pyrryl)-phenyl]-acetic acid passes over under 0.1 Torr at 164°, $n_D^{25}$ 1.5976. It crystallizes on standing (M.P. 68°–74°) and after recrystallization from cyclohexane-benzene (20:1) melts at 75°–76°. Positive Ehrlich reaction.

The starting material is produced as follows:

46.3 g (0.240 mol) of [p-(acetoamido)-phenyl]-acetic acid [S. Gabriel Chem. Ber. 15, 834 (1882)]are suspended in a mixture of 100 ml of acetone and 108 ml of concentrated hydrochloric acid. While stirring vigorously, a solution of 10.7 g (0.100 mol) of sodium chlorate in 13 ml of water is added dropwise within one hour at −5°. The reaction mixture is brought to 0° and stirred for 15 minutes. 75 ml of conc. hydrochloric acid are then added, the solution is refluxed for 2 hours and evaporated to dryness on a water-bath (at 100°) under 15 Torr. The residue is as far as possible dissolved in 250 ml of 1-N hydrochloric acid the undissolved part (about 2.9 g) separated off by filtration. The hydrochloric acid solution is brought to pH 2.4 by the addition of 3-N sodium hydroxide. The precipitate is filtered off, washed with water and dried at 80°. 31.0 g of (4-amino-3-chlorophenyl)-acetic acid are obtained as a grey-brown powder. M.P. 133°–135°, which can be further processed directly. Through recrystallization from water and then from isopropanol-benzene, a pure substance is obtained, M.P. 135°–137°. The position of the chlorine atom can be determined spectroscopically (NMR).

EXAMPLES 24

5.47 g (0.020 mol) of 1-[p-(1-carboxypropyl)-phenyl]-2-pyrrol carboxylic acid are heated in a bath at 200° for about 3 minutes until the evolution of carbon dioxide stops. The resulting clear, red liquid solidifies on cooling. Recrystallization from a mixture of 8 ml of benzene and 8 ml of cyclohexane yields 3.16 g of 2-[p-(1-pyrryl)-phenyl]-butyric acid of M.P. 108°–110°. After further recrystallization from ether the melting point is 112°–113°.

The dicarboxylic acid necessary as starting material is produced as follows:

a. 34.6 g (0.193 mol) of 2-(p-amino-phenyl)-butyric acid and 38.0 g (0.200 mol) of 2,5-dimethoxy-tetrahydro-2-furan-carboxylic acid-methylester [N. Clauson-Kaas and F. Limborg, Acta Chem. Scand. 6, 551 (1952)]are refluxed for 16 hours in 100 ml of acetic acid. The reaction mixture is then evaporated to dryness in a water-bath at 100° under 10 Torr. The residue is heated for 1 hour to 100° in a solution of 24 g of sodium hydroxide in 100 ml of water. After cooling to room temperature, 100 ml of water, 250 ml of 3-N hydrochloric acid and 1,200 ml of chloroform are added. The mixture is vigorously shaken and then the chloroform phase is separated off and dried with 50 g of magnesium sulphate. The solvent is evaporated off on a water-bath at 95°, ultimately under 20 Torr. The brown, crystalline residue is rubbed with 50 ml of ether and the resulting crystal suspension is filtered. The crystals are washed twice with 25 ml of ether each time and dried. 32.5 g of 1-[p-(1-carboxypropyl)-phenyl]-2-pyrrol carboxylic acid are obtained as an almost white powder which melts on decarboxylizing at 177°–179° and shows a positive Ehrlich reaction. It is pure enough for subsequent decarboxylation. By recrystallizing 10.0 g from 70 ml of acetone 4.8 g of pure substance is obtained, M.P. 184°–185°.

EXAMPLE 25

7.1 g (0.030 mol) of [3-chloro-4-(1-pyrryl)-phenyl]-acetic acid (cf. Example 23) are reacted with 3.27 g (0.030 mol) of ethyl-bromide analogously to Example 6, whereupon 0.54 g (7 percent of the theoretical) of 2-[3-chloro-4-(1-pyrryl)-phenyl]-butyric acid are obtained, M.P. 78°–80° (last crystallization from cyclohexane). Positive Ehrlich reaction.

Also analogously to Example 6, 6.0 g (0.025 mol) of [3-chloro-4-(1-pyrryl)-phenyl]-acetic acid are reacted with 4.53 g (0.032 mol) of methyl-iodide. 2-[3-chloro-4-(1-pyrryl)-phenyl]-propionic acid is obtained, M.P. 78°–80°. Positive Ehrlich reaction.

EXAMPLE 26

24.3 g (0.10 mol) of 2-[p-(1-pyrryl)-phenyl]-butyric acid methyl ester (see example 14) are refluxed for 1 hour with 134 ml of 1.5-N sodium hydroxide solution (0.20 mol) and 134 ml of ethanol. The reaction solution is then evaporated in vacuo, the residue dissolved in water, the aqueous alkaline solution shaken with about 100 ml of ether, then filtered and adjusted to pH 3–4 with about 6-N hydrochloric acid. The precipitated crystals are filtered off with suction, washed with water and dried during 15 hours at 50° and about 0.5 Torr. 2-[p-(1-pyrryl)-phenyl]-butyric acid is thus obtained, M.P. 111°–112°. After recrystallization from benzene-cyclohexane (1:1) the substance melts at 112°–113°.

EXAMPLE 27

4.20 g (0.02 mol) of 2-[p-(1-pyrryl)-phenyl]-butyronitrile are refluxed for 30 hours in a solution of 5.61 g (0.10 mol) of potassium hydroxide in 34 ml of methanol and 6 ml of water. The reaction mixture is evaporated in vacuo, the residue dissolved in water, the aqueous alkaline solution shaken with ether, filtered and adjusted to pH 3–4 with about 6-N hydrochloric acid. The precipitated crystals are filtered with suction, washed with water and dried for 15 hours at 50° and about 0.5 Torr. The 2-[p-(1-pyrryl)-phenyl]-butyric acid obtained melts at 110°–111° after recrystallization from benzene-cyclohexane (1:1) at 112°–113°.

In an analogous manner 4.56 g (0.02 mol) of 2-[p-(1-pyrryl)-phenyl]-butyramide are hydrolyzed to 2-[p-(1-pyrryl)-phenyl]-butyric acid.

The new starting materials are produced as follows:

a¹. 18.2 g (0.10 mol) of [p-(1-pyrryl)-phenyl]-acetonitrile are reacted with 10.9 g (0.10 mol) of ethylbromide analogously to Example 6, to obtain a mixture (about 20 g) of 2-[p-(1-pyrryl)-phenyl]-butyronitrile and 2-ethyl-2-[p-(1-pyrryl)-phenyl]-butyronitrile the pure substances of which are isolated by preparative thin layer chromatography. The 2-[p-(1-pyrryl)-phenyl]-butyronitrole obtained melts at 38°–39°.

a². 12.2 g (0.50 mol) of 2-[p-(1-pyrryl)-phenyl]-butyric acid methyl ester (see Example 14) are heated for 6 hours at 180° in an autoclave with 30 ml of ammonia (measured at −40°). The reaction mixture is evaporated finally at 50° and 0.1 Torr and the residue is recrystallized from 60 ml of benzene. The 2-[p-(1-pyrryl)-phenyl]-butyramide obtained, M.P. 141°–144°, is dissolved in 1,000 ml of ether for further purification, the ether solution is filtered, washed with 20 ml 1-N hydrochloric acid and three times with 50 ml each of water and dried over sodium sulphate. The ether solution is concentrated to 50 ml pure 2-[p-(1-pyrryl)-phenyl]-butyramide crystallizing out, M.P. 145°–146°.

EXAMPLE 28

0.9 of methyl-[p-(1-pyrryl)-phenyl]-malonic acid is heated for 20 minutes at 170°–180° on an oil bath, after which no evolution of gas is observed. On cooling the reaction product crystallizes. It is dissolved in 3 ml of 1-N sodium hydroxide solution. The solution is extracted by shaking with 5 ml of ether and the aqueous phase is brought to pH 2 − 3 with 2N hydrochloric acid. 2-[p-(1-pyrryl)-phenyl]-propionic acid is obtained, M.P. 161°–168°. By recrystallizing from carbon-tetrachloride-chloroform the melting point rises to 168°–169°.

The new malonic acid derivative used as starting material is prepared as follows:

a. 1.9 g of methyl-[p-(1-pyrryl)-phenyl]-malonic acid diethylester (see Example 18b) are dissolved in 30 ml of ethanol and a solution of 0.9 g of potassium hydroxide in 10 ml of water is added thereto. The solution is again made homogeneous if necessary by the addition of more ethanol and then stored in the dark for 4 days. After evaporating at 12 Torr and 30° bath temperature the residue is dissolved in 10 ml of water and the solution is extracted with 10 ml of ether. The aqueous phase is acidified to pH 2 with 2-N hydrochloric acid while cooling with ice and the precipitate of methyl-[p-(1-pyrryl)-phenyl]-malonic acid formed is filtered by suction, washed with 5 ml of water and dried in vacuo. The crude acid melts at 130°–140° while evolving gas.

EXAMPLE 29

4.95 g of racemic 2-[p-(1-pyrryl)-phenyl]-butyric acid are dissolved in 30 ml of acetone and a solution of 8 g cinchonidin in 25 ml of methanol is added thereto. The methanol-acetone mixture is evaporated on a water bath, acetone is added, the mixture is again evaporated and the residue is taken up in 50 ml of hot acetone. On cooling 11g of a mixture precipitates consisting chiefly of the cinchonidin salt of the (−)-2-[p-(1-pyrryl)-phenyl]-butyric acid and a little excess cinchonidin. It is filtered by suction and the cinchonidin salt is again recrystallized with acetone. To isolate the free acid, 2 g of the recrystallized cinchonidin salt, M.P. 140°, are suspended in 50 ml of water, then 15 ml of 2-N hydrochloric acid are added, the precipitated acid is taken up in ether, the etherified solution is washed twice in water and dried over sodium sulphate and evaporated. The residue is recrystallized from carbon tetrachloride and (−)-2-[p-(1-pyrryl)-phenyl]-butryic acid is obtained, M.P. 130°–132°, $[\alpha]_D^{25}$ −39.9°.

The mother liquors of the two crystallizations of the cinchonidin salt mentioned above are combined and evaporated to dryness in vacuo. The residue is suspended in 50 ml of 1-N hydrochloric acid and shaken with 50 ml of ether until the whole is dissolved. The ether phase is separated, washed with water, dried over sodium sulphate, and evaporated. The residue (2.65 g) is dissolved in 40 ml of hot isopropanol and a hot solution of 1.8 g (+)-α-phenyl ethylamine in 20 ml of isopropanol is added thereto. On cooling 3.2 g of the (+)-α-phenyl)-ethylamine salt of (+)-2-[p-(1-pyrryl)-phenyl]-butyric acid crystallizes as colorless needles which melt after recrystallizing twice according to the preceding resolution from ethanol at 148°–150°, $[\alpha]_D^{25}$ +4.40 (c = 1, methanol). 1.25g of the salt so obtained are suspended in 30 ml of water. 10 ml of 2-N hydrochloric acid is added and shaken with ether until the whole is dissolved. The ether phase is separated, washed twice with water, dried over sodium sulphate and evaporated to dryness. The residue is recrystallized with 5 ml of carbon-tetrachloride to obtain (+)-2-[p-(1-pyrryl)-phenyl]-butyric acid, M.P. 130°–132°, $[\alpha]_D^{25}$ +39.9 (c = 1, methanol).

What is claimed is:

1. A compound of the formula

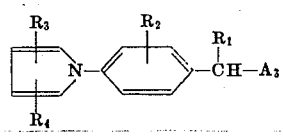

wherein $R_1$ represents hydrogen, lower alkyl, lower alkenyl or lower alkinyl, $R_2$ represents hydrogen, lower alkyl, lower alkoxy or halogen, $R_3$ and $R_4$ independently of each other represent hydrogen or lower alkyl, and $A_3$ represents cyano or carbamoyl.

2. A compound as defined in claim 1 which is [p-(1-pyrryl)-phenyl]-acetonitrile.

3. A compound as defined in claim 1 which is 2-[p-(1-pyrryl)-phenyl]-butyronitrile.

4. A compound as defined in claim 1 which is 2-[p-(1-pyrryl)-phenyl]-butyramide.

* * * * *